(12) United States Patent
Javanifard et al.

(10) Patent No.: US 6,567,763 B1
(45) Date of Patent: May 20, 2003

(54) ANALOG TEMPERATURE MEASUREMENT APPARATUS AND METHOD

(75) Inventors: Jahanshir J. Javanifard, Sacramento, CA (US); Steve Wells, El Dorado Hills, CA (US); Hari Giduturi, Folsom, CA (US); Dave Ward, Sacramento, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/474,835

(22) Filed: Dec. 30, 1999

(51) Int. Cl.[7] ................................................. G01K 7/00
(52) U.S. Cl. ........................ 702/130; 702/99; 374/173
(58) Field of Search .......................... 702/99, 117, 130, 702/132; 374/173, 178, 181, 183; 327/63, 67, 512

(56) References Cited

U.S. PATENT DOCUMENTS

| | | | |
|---|---|---|---|
| 5,039,878 A | * | 8/1991 | Armstrong et al. ......... 327/512 |
| 5,098,200 A | * | 3/1992 | O'Brien et al. ............. 374/163 |
| 5,829,879 A | * | 11/1998 | Sanchez et al. ............. 374/178 |
| 5,946,258 A | | 8/1999 | Evertt et al. |
| 6,055,489 A | | 4/2000 | Beatty et al. ................ 702/130 |
| 6,166,586 A | * | 12/2000 | Sanchez et al. ............. 327/542 |

OTHER PUBLICATIONS

Beyer, William, H.,*CRC Standard Mathematical Tables, Natural or Naperian Logarithims*, 24th Edition, CRC Press, pp. 148–150, Apr. 1976.

* cited by examiner

Primary Examiner—Bryan Bui
(74) Attorney, Agent, or Firm—Blakely, Sokoloff, Taylor & Zafman LLP

(57) ABSTRACT

A temperature measurement device includes at least one constant current generator to provide a first current and a second current to a temperature sensor, and a signal processing element to provide an analog output signal corresponding to a temperature of the temperature sensor based on a difference between a first voltage of the temperature sensor at the first current and a second voltage of the temperature sensor at the second current.

23 Claims, 7 Drawing Sheets

ANALOG TEMPERATURE MEASUREMENT APPARATUS AND METHOD

FIELD OF THE INVENTION

The present invention relates to integrated circuits. In particular, the present invention relates to analog temperature measurement in integrated circuits.

BACKGROUND OF THE INVENTION

Heat produced by electric current in integrated circuits becomes more problematic as the operating frequencies and transistor densities of integrated circuits continue to increase. A densely integrated, high frequency circuit, such as a microprocessor, may be able to generate enough heat to permanently damage itself. Many such integrated circuits include internal temperature sensors so that, when internal temperatures approach critical levels, the circuits can be shut down or their operating frequencies can be reduced so as to generate less heat.

Measuring external temperature an also be important. For instance, if the temperature around an integrated circuit is above a certain level, the integrated circuit may not be able to dissipate enough heat to sustain prolonged high frequency operation. In which case, depending on the external temperature, an operating frequency for an integrated circuit may be adjusted to sustainable levels.

A diode is commonly used as a temperature sensor in and around integrated circuits. For a given current, voltage across a diode is dependent on temperature. By measuring the voltage across a diode for two different known currents, the temperature of the diode can be calculated. That is, temperature is proportional to the voltage difference across a diode for two known currents. The relationship can be expressed as:

$$T = K(V_1 - V_2)/\mathrm{Ln}\left(\frac{I_1}{I_2}\right),$$

where T is temperature in Kelvin,

K is a constant, $I_1$ and $I_2$ are known currents, and $V_1$ and $V_2$ are voltages measured across the diode at currents $I_1$ and $I_2$ respectively.

Temperature can be measured wherever a temperature sensor can be located. For instance, a microprocessor may include an internal diode for sensing the junction temperature inside the microprocessor. A chassis for housing a microprocessor may include one or more diodes for sensing the environmental temperature around the microprocessor.

Remote circuitry is usually used to measure the temperature in or around an integrated circuit element. For instance, circuitry to measure the temperature inside a microprocessor is often located on the motherboard to which the microprocessor is coupled. Remotely locating the measurement circuitry has numerous advantages such as less susceptibility to damage from the heat source, independent access to a power supply so that if a heat producing component is shut down to prevent over heating the measurement circuitry can continue to measure the temperature and indicate when the component can safely be brought back on line, etc.

In many devices, especially portable devices, very little space is left unused on a motherboard. A typical motherboard may need room for a large number of components, including processor packages, memory cards, input/output ports, etc., as well as a large number of traces and buses to connect all the components. A great deal of effort has been devoted to reducing the complexity and cost of motherboard designs. As market pressures continue to push toward more compact devices with greater functionality, the need for available space on motherboard designs will continue to grow.

SUMMARY OF THE INVENTION

A temperature measurement device includes at least one constant current generator to provide a first current and a second current to a temperature sensor, and a signal processing element to provide an analog output signal corresponding to a temperature of the temperature sensor based on a difference between a first voltage of the temperature sensor at the first current and a second voltage of the temperature sensor at the second current.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention provides analog temperature measurement circuitry for measuring the internal and/or external temperature of integrated circuit components. Although the present invention can be performed in virtually any semiconductor process, and incorporated in virtually any component on a motherboard, in various embodiments, the present invention is implemented in a Flash basic input/output system (BIOS) chip. Flash technology, as used herein, refers to an integrated circuit technology commonly used for flash electrically erasable programmable read only memory (EEPROM). Flash technology is analog in nature as opposed to digital. That is, transistors in flash technology are operated over a range of voltage levels rather than just the digital voltage levels of on and off.

As discussed more fully below, the analog nature of flash technology makes flash technology particularly suited for the largely analog temperature measurement process of the present invention. Flash memory is commonly used to store BIOS for a microprocessor. In which case, temperature measurement can be integrated into available flash technology resources, freeing up space and reducing complexity in motherboard designs.

Figure 1:
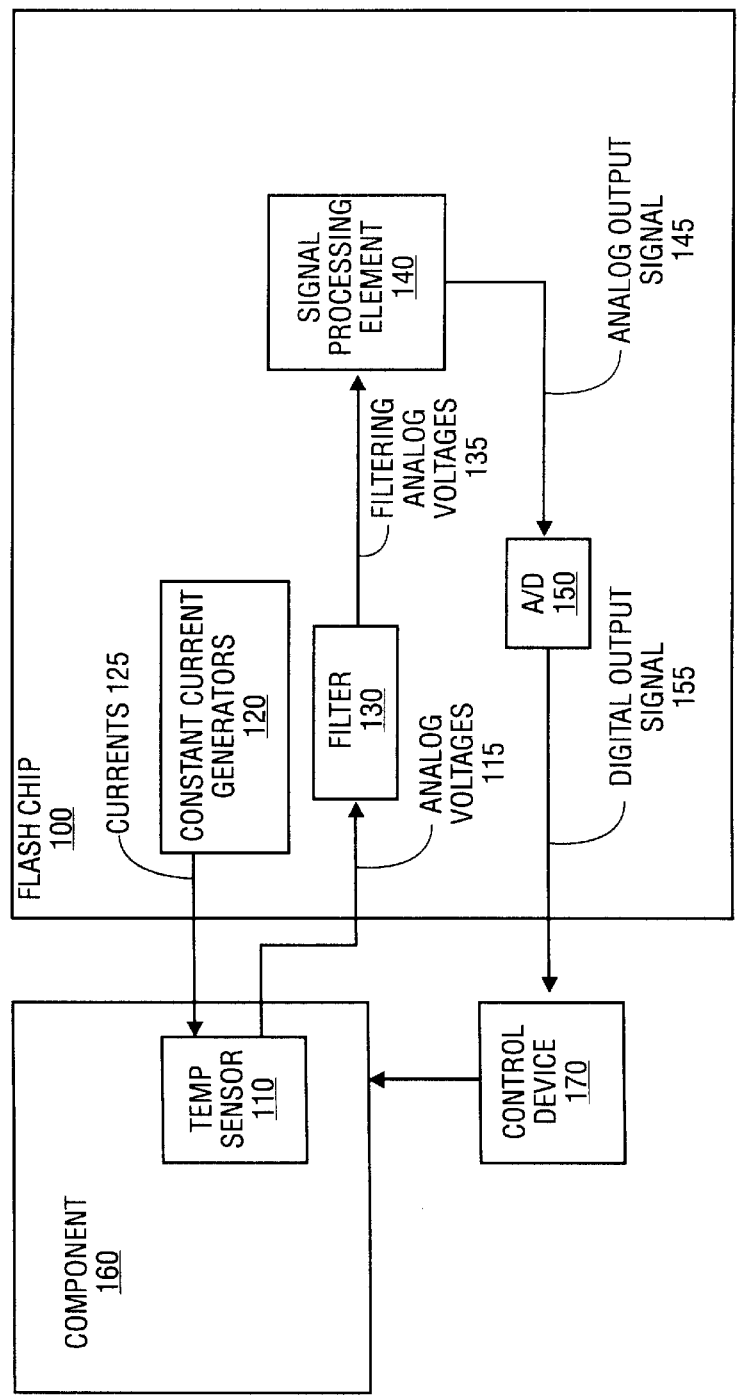
FIG. 1 illustrates one embodiment of the present invention.

FIG. 1 illustrates one embodiment of a flash chip 100 according to the teachings of the present invention. Flash chip 100 includes constant current generators 120, filter 130, signal processing element 140, and analog to digital converter (A/D) 150. Constant current generators 120 provide at least two constant currents 125 to temperature sensor 110 in component 160. In response to the constant currents, temperature sensor 110 provides analog voltages 115. There is one analog voltage corresponding to each constant current 125. Filter 130 filters out noise in analog voltages 115 that may have been introduced, for instance, by component 160. Filtered analog voltages 135 are provided to signal processing element 140.

Based on the difference between at least two voltages, signal processing element 140 provides analog output signal 145 to A/D 150. As discussed above, analog output signal 145 is proportional to the temperature at temperature sensor 110. A/D 150 converts the analog signal into digital output signal 155. In the illustrated embodiment, digital output signal 155 is provided to a control device 170. Based on the temperature indicated by signal 155, control device 170 manages operation of component 160.

Those skilled in the art will recognize that alternate embodiments of the present invention may not require all of the elements illustrated in FIG. 1, certain elements may be combined with other elements, and additional elements may be included. For instance, depending on the nature of component 160, filter 130 may not be needed, or additional filtering may be needed. As another example, depending on the nature of control device 170, A/D 150 may not be needed where, for instance, control device 170 is an analog device rather than a digital device. Where A/D 150 is needed, the analog to digital conversion can be performed in any number of ways.

Component 160 and control device 170, in the illustrated embodiment, are separate. In alternate embodiments, component 160 may include control device 170. For instance, where component 160 is a microprocessor, the microprocessor may include circuitry to manage operation of the microprocessor depending on temperature. In which case, output signal 155 may be provided directly to the microprocessor.

Control device 170 may manage operation of component 160 in any number of ways. For instance, if the temperature indicated by output signal 155 reaches a critical level, control device 170 may shut down component 160 entirely for a fixed duration of time or until the temperature decreases sufficiently. Alternately, control device 170 may reduce the operating frequency of component 160 as temperature increases.

In various embodiments, temperature sensor 110 may be an internal sensor or an external sensor. For instance, temperature sensor 110 may be a diode integrated into component 160 such that the temperature of the diode is equivalent to the junction temperature within component 160. If temperature sensor 110 is an external sensor, it may be located in the vicinity of component 160 to measure the environmental temperature. For instance, if the environmental temperature is above a certain level, the temperature difference between component 160 and the surrounding air may be inadequate to cool component 160 at its maximum operating frequency. In which case, control device 170 may shut down component 160 or reduce the operating frequency of component 160 based on the environmental temperature.

In alternate embodiments, flash chip 100 may include circuitry to measure the temperature at multiple temperature sensors 110 in and around component 160 and/or additional components (not shown). Temperature sensor 110 could also be located in and/or around flash chip 100.

In various embodiments, as discussed below, signal processing element 140 can be any analog element that takes the difference of at least two signals. For instance, in one embodiment, signal processing element 140 is a differential switch capacitor operational amplifier. Also in various embodiments, as discussed below, filter 130 is a low pass filter and constant current generators 120 produce two currents 125, each of which have a reduced susceptibility to signal variation due to variation in temperature, manufacturing process, and/or supply voltage.

Figure 2:
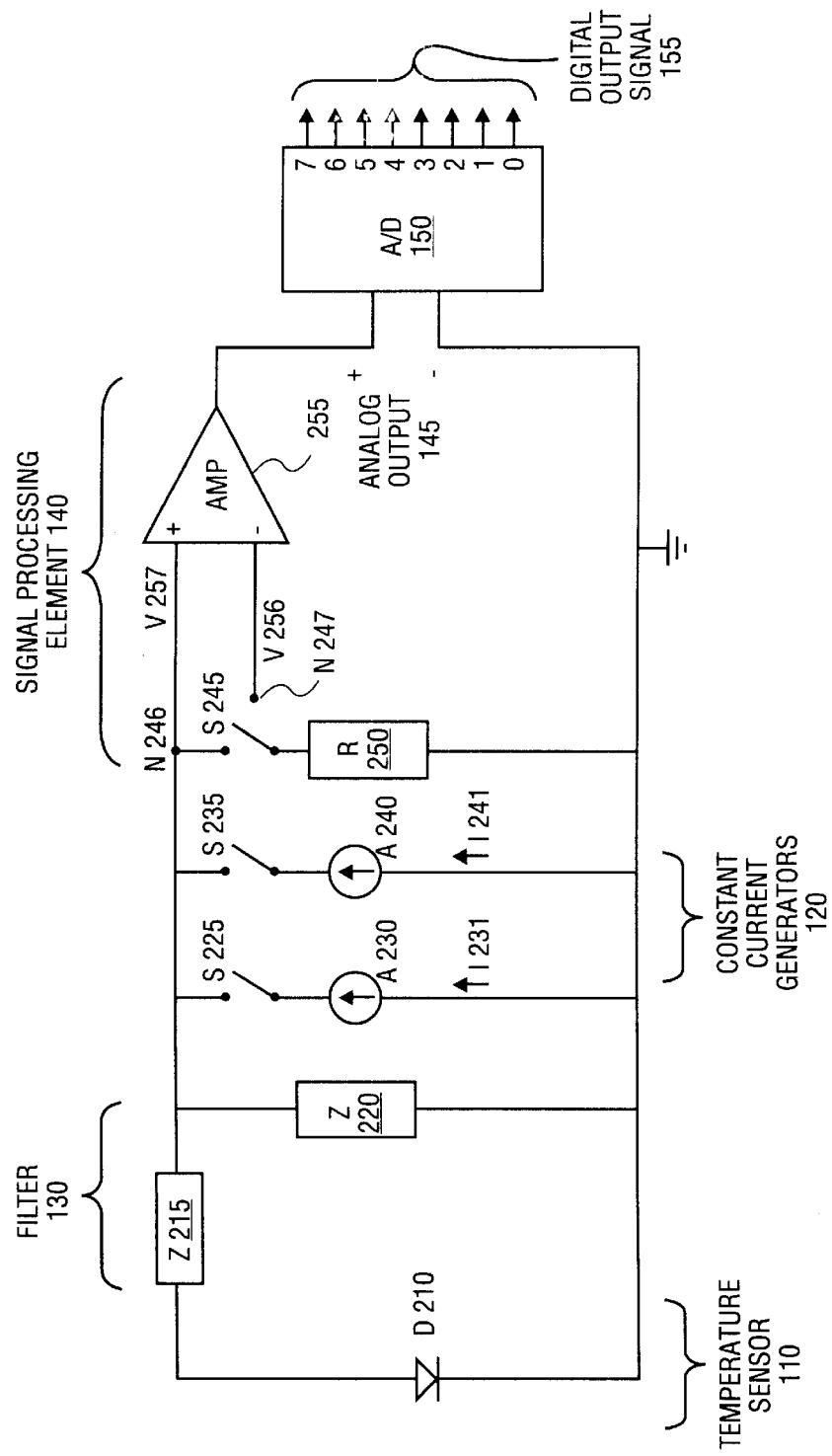
FIG. 2 illustrates one embodiment of the present invention in greater detail.

FIG. 2 illustrates one embodiment of temperature sensor 110, filter 130, constant current generators 120, and signal processing element 140 in greater detail. Temperature sensor 110 comprises a single diode 210. Filter 130 comprises a first order filter having two filter components, a series component 215 and a parallel component 220. In alternate embodiments, filter 130 comprises any multi-order filter. Any number of techniques can be used to tune filter 130 to eliminate or reduce interference in a voltage measured across diode 210.

Constant current generators 120 include constant current generator 230, that produces current 231, and constant current generator 240, that produces current 241. Switches 225 and 235 are used to apply one or the other of currents 231 or 241 to diode 210 through filter 130.

Signal processing element 140 includes amplifier 255, switch 245, and analog register 250. Amplifier 255 generates analog output signal 145 based on the difference between voltages 256 and 257 with respect to ground. A/D 150 generates the digital output signal 155 based on the analog signal 145. In the illustrated embodiment, A/D 150 converts the analog value into an 8-bit digital value. In other embodiments, digital output signal 155 may be more or less than 8 bits.

Switches 225, 235, and 245 are controlled so that currents 231 and 241 are sequentially applied to diode 210. At a first instant in time, switch 225 is closed, switch 235 is open, and switch 245 is coupled to node 246. In which case, the voltage at diode 210 due to current 231 is stored in analog register 250. Any number of devices can be used for register 250 that can sample and hold an analog voltage. At a next instant in time, switch 225 is open, switch 235 is closed, and switch 245 is coupled to node 247. In which case, the voltage stored in register 250 (the voltage at diode 210 due to current 231) is applied at voltage 256 of amplifier 255 and the voltage at diode 210 due to current 241 is applied at voltage 257 of amplifier 255. While amplifier 255 outputs analog output signal 145, A/D 150 outputs digital output signal 155.

As discussed above, analog output signal 145 is equivalent to the difference in the voltages across diode 210 due to currents 231 and 241. Analog output signal 145 is also proportional to the temperature at diode 210. In one embodiment, current 231 is a known constant current and is two orders of magnitude larger than current 241. In which case, based on the two known constant currents and the difference in voltages, the temperature at sensor 110 can be calculated.

Those skilled in the art will recognize that FIG. 2 illustrates only ideal elements. In practice, the embodiment of FIG. 2 may include additional elements. Those skilled in the art will also recognize that the embodiment of FIG. 2 can be implemented in virtually any semiconductor technology in any number of ways. For instance, a state machine, clock-based switching, etc., can be used to generate digital output signal 155 at appropriate instances.

Figure 3:
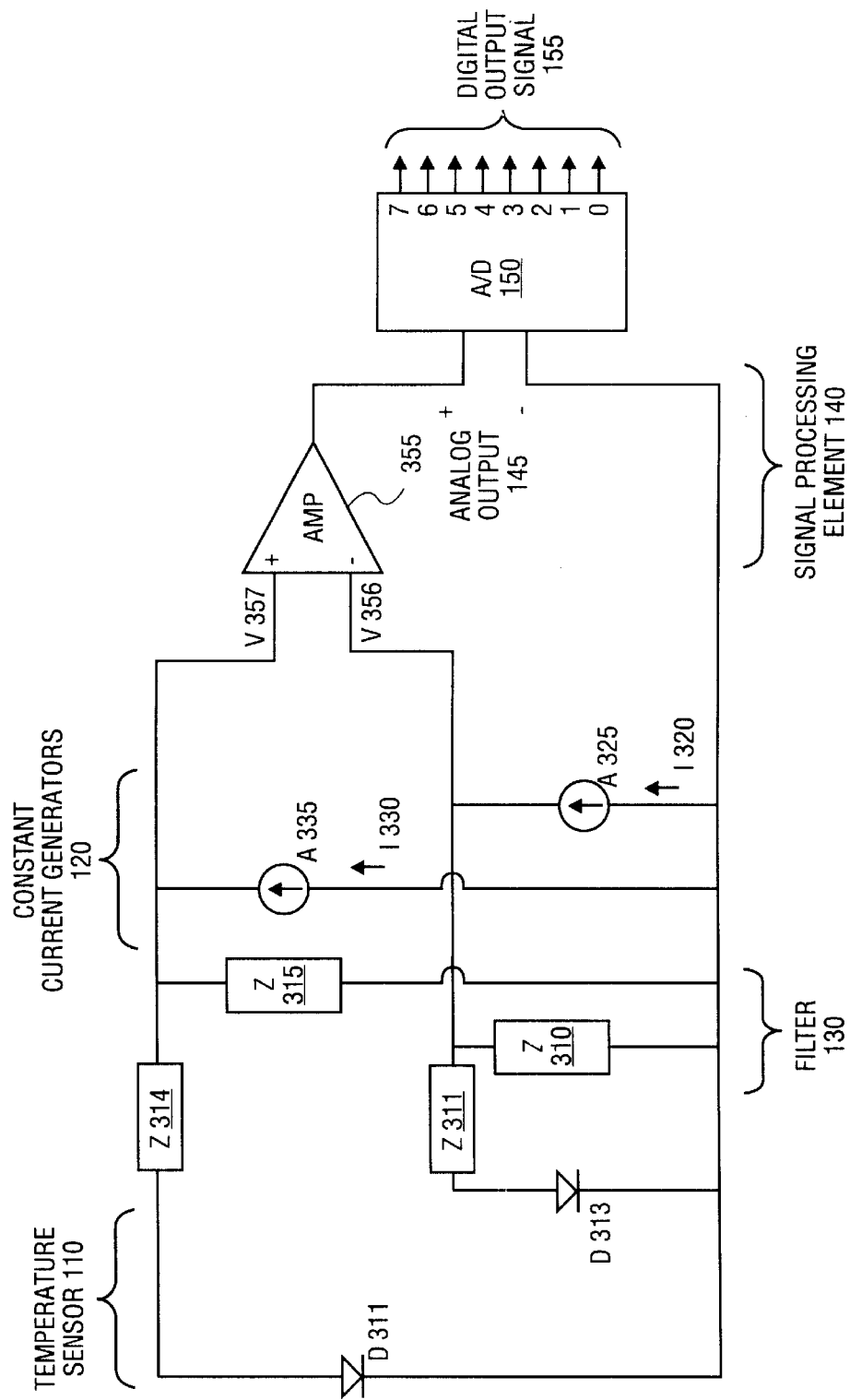
FIG. 3 illustrates another embodiment of the present invention in greater detail.

FIG. 3 illustrates another embodiment of temperature sensor 110, filter 130, constant current generators 120, and signal processing element 140 in greater detail. In FIG. 3, rather than sequentially applying two different currents to one diode, different currents are applied to two different diodes simultaneously. Less circuitry is needed for control, but more circuitry is needed for temperature sensor 110 and filter 130. Also, using two separate diodes runs the risk of error due to slight manufacturing variation between the diodes and the filter components.

In FIG. 3, temperature sensor 110 includes diodes 311 and 313. Filter 130 includes a series filter component 314 and a parallel filter component 312 to filter noise at diode 311, and a series filter component 311 and a parallel filter component 310 to filter noise at diode 313. Constant current generator 335 applies current 330 to diode 311, and constant current generator 325 applies current 320 to diode 313. Diode 311 applies a voltage 357 at amplifier 355 due to current 330, and diode 313 applies a voltage 356 at amplifier 355 due to current 320. Amplifier 355 generates analog output signal 145 based on the difference in the voltages 357 and 356.

As with FIG. 2, the embodiment of FIG. 3 illustrates only ideal elements. Those skilled in the art will recognize that additional elements may be needed in practice. Furthermore, FIGS. 2 and 3 illustrate just two possible embodiments of the present invention. Those skilled in the art will recognize that a variety of additional circuits can be used to generate an analog output signal based on the difference in two voltages at a temperature sensor.

Accurately measuring temperature is very important. In order to take full advantage of the performance capabilities of a component, the component may be designed to operate very near its critical operating temperature. Inaccurately measuring temperature may result in permanent damage to the component if the temperature measurement is lower than the actual temperature, and the component may be unnecessary shut down or slowed down if the temperature measurement is higher than the actual temperature. Variations in the manufacturing process, variations in the source voltage used to operate the temperature measurement circuitry, and variations in temperature at the temperature measurement circuitry can all introduce error in the temperature measurements.

Error introduced by constant current generators 120 are of particular concern. For instance, if the current applied to temperature sensor 110 can change by up to 5% due to temperature variation at constant current generators 120, then the temperature measurement has at least a 5% margin of error. That is, for any change in the temperature measurement below 5%, it would be impossible to tell how much of the change was due to a temperature change at the sensor and how much of the change was due to a temperature change at the current generators.

Figure 4:
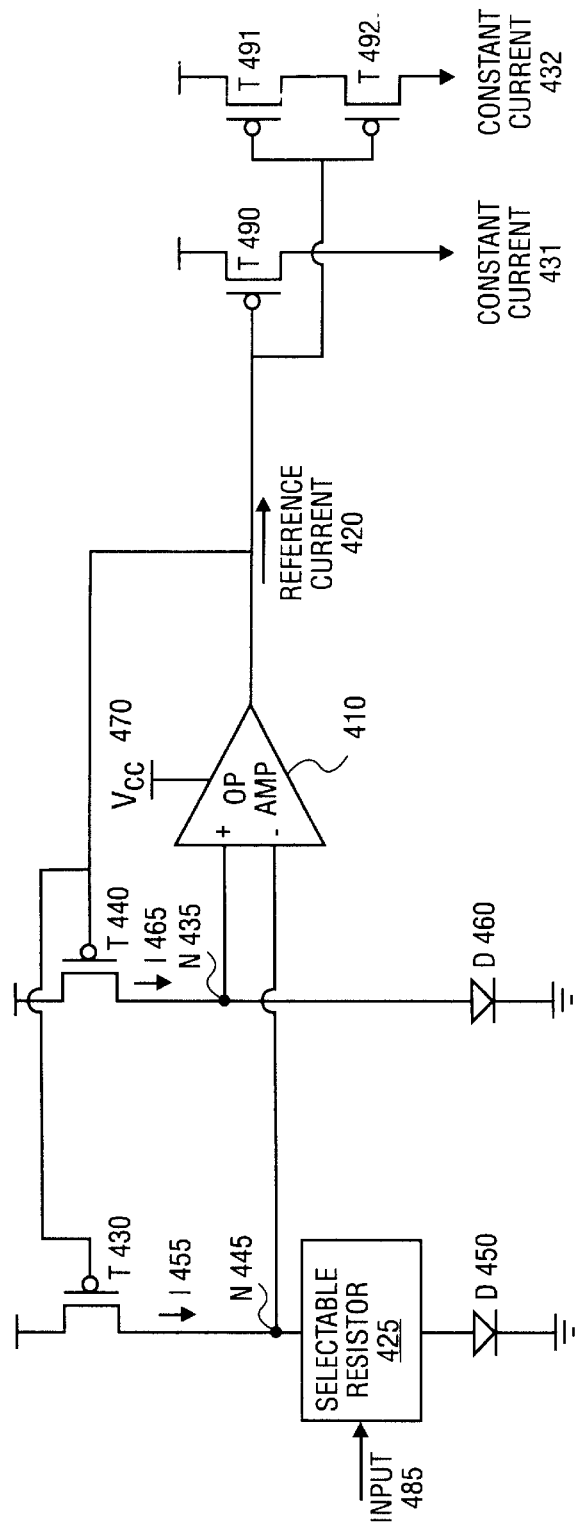
FIG. 4 illustrates one embodiment of a constant current generator according to the teachings of the present invention.

FIG. 4 illustrates one embodiment of a constant current generator that can be used in the present invention to apply both constant currents to the temperature sensor such that each current has a reduced susceptibility to signal variation due to changes in temperature, manufacturing process, and/or source voltage. Signal variation is reduced by matching component values within the current generator so as to counteract signal variation internally.

In FIG. 4, reference current 420 is generated based on source voltage 470 and the current differential between currents 455 and 465 through transistors 430 and 440. In general, reference current 420 will remain constant as long as the difference between currents 455 and 465 remains constant. Currents 455 and 465 need not be equal as long as the difference between the currents remains constant.

Current is related to voltage. One approach to achieving reduced susceptibility to signal variation is to begin by reducing the voltage differential between nodes 435 and 445 due to temperature, process, and source voltage variation. The voltage at node 435 is equal to the voltage across diode 460. The voltage at node 445 is equal to the voltage across selectable resistor 425 and diode 450.

The characteristics of resistor 425 and diodes 450 and 460 vary with changes in temperature. In general, the voltage across a resistor having a positive temperature coefficient increases as temperature increases, and the voltage across a diode decreases as temperature increases. The present invention takes advantage of this inverse relationship of resistors and diodes to temperature. Specifically, selectable resistor 425 is included in the constant current generator so as to counteract the temperature effects on diodes 450 and 460.

For example, if the resistance of selectable resistor 425 is matched to the diodes such that the change in voltage across diode 460 due to temperature is equal to the change in voltage across diode 450 and resistor 425 due to temperature, then the voltage difference between nodes 435 and 445 will remain constant with respect to temperature.

The voltage across diodes 450 and 460, respectively, can be represented by the following equations:

$$V_{D450} = \frac{kT}{q}\text{Ln}\left(\frac{I_{455}}{I_{450O}}\right),$$

$$V_{D460} = \frac{kT}{q}\text{Ln}\left(\frac{I_{465}}{I_{460O}}\right),$$

where:
k=Boltzman's constant=1.38×10$^{-23}$ Joules/Kelvin,
q=the magnitude of electronic charge=1.6×10$^{-19}$ Joules/Volt,
T=absolute temperature in Kelvin,
I=current as a function of temperature, $I_{4500}$=the reverse saturation current for diode 450, and
$I_{4600}$=the reverse saturation current for diode 460.

In which case, the voltage across resistor 425 can be represented as:

$$V_{R425} = V_{D460} - V_{D450} = \frac{kT}{q}\text{Ln}\left(\frac{I_{465}}{I_{4600}}\right) - \frac{kT}{q}\text{Ln}\left(\frac{I_{455}}{I_{4500}}\right),$$

$$V_{R425} = \frac{kT}{q}\left(\text{Ln}\left(\frac{I_{465}}{I_{4600}}\right) - \text{Ln}\left(\frac{I_{455}}{I_{4500}}\right)\right) = \frac{kT}{q}\text{Ln}\left(C\frac{A_{D450}}{A_{D460}}\right),$$

where:
C=a constant (C=1 if $I_{465}$=$I_{455}$),
$A_{450}$ equals the area of diode 450, and
$A_{460}$ equals the area of diode 460.

The voltages across selectable resistor 425 and diodes 450 and 460 all vary with respect to temperature. Through any number of mathematical techniques, a value for resistor 425 at room temperature can be selected such that the increase in voltage across resistor 425 with respect to temperature largely counteracts the decrease in voltages across diodes 450 and 460 with respect to temperature over a range of operating temperatures.

Signal variation, however, is also due to process variation and source voltage variation. The accuracy of the manufacturing process is limited, leading to process variation. As layers of material are grown and etched away on a silicon wafer, there are small variations in chemical concentrations, the duration of light exposure, etc. Even if values for selectable resistor 425 and diodes 450 and 460 are mathematically matched as discussed above, process variation and variation in source voltage will produce variation in constant current 420 from one integrated circuit to another integrated circuit at a given temperature. For instance, if the voltage increase due to process variation across selectable resistor 425 can vary plus or minus 5%, and the voltage decrease due to process variation across diodes 450 and 460 can vary plus or minus 5%, the variation of constant current 420 may vary plus or minus 10% from one constant current generator to another.

Figure 5:
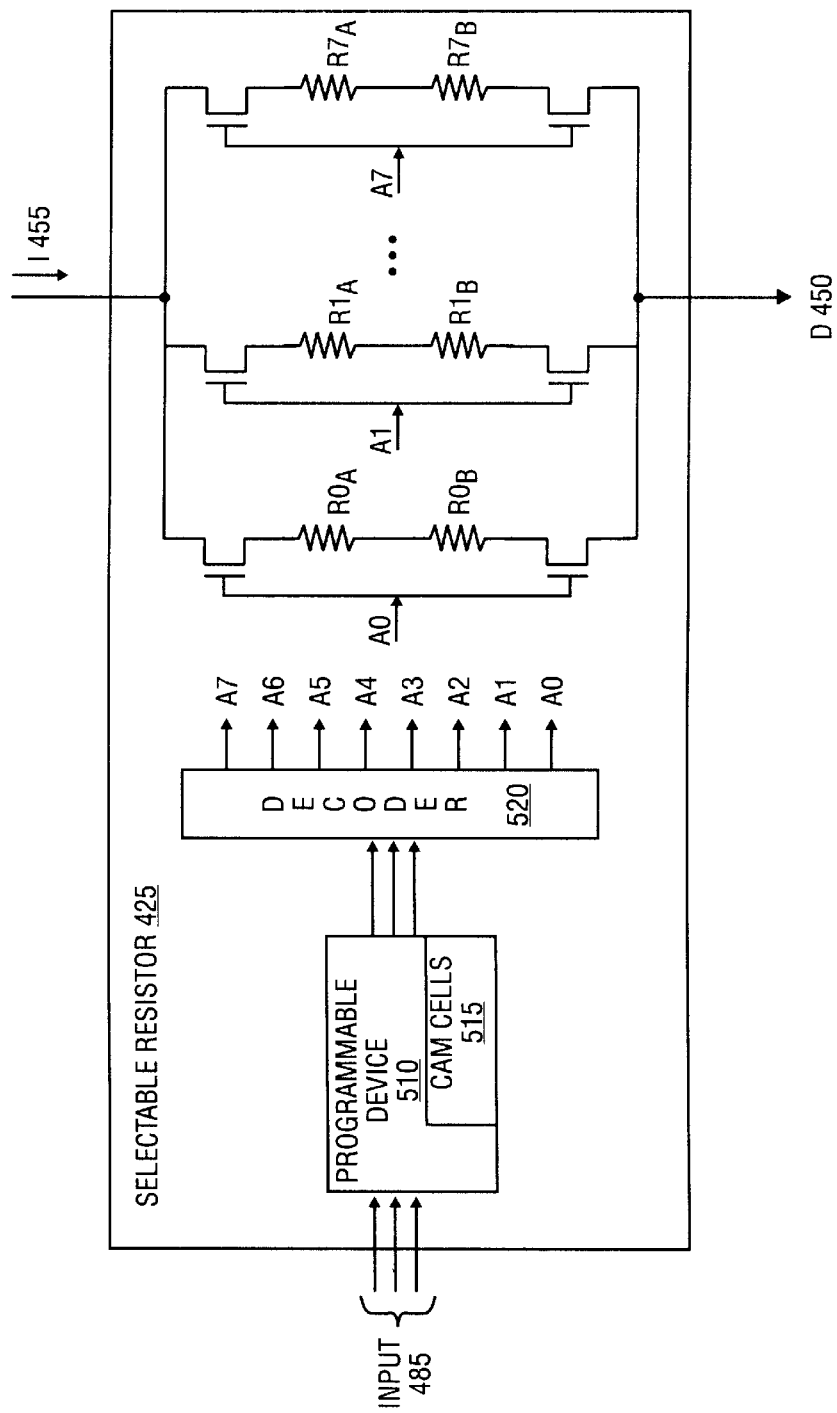
FIG. 5 illustrates one embodiment a selectable resistor according to the teachings of the present invention.

The present invention, however, reduces susceptibility due to process variation and source voltage variation by selecting a resistor value to be used in selectable resistor 425 from an array of resistor values based on input 485. For instance, FIG. 5 illustrates one embodiment of selectable resistor 425 having eight possible resistor values, R0 to R7. (As discussed below, each resistor also has two resistor components, A and B.) In alternate embodiments, any number of resistor values can be included in selectable resistor 425, such as 32, 64, or 128 resistors, and need not be a modulo of 2.

In the illustrated embodiment, input 485 is a three bit value. Each unique three bit input is decoded by decoder 520 to select one of the resistors, R0 to R7. Input 485 is used to search for a resistor that adequately reduces the voltage differential at nodes 435 and 445 in FIG. 4. If a resistor is found, the unique three bit input 485 corresponding to that resistor is programmed into device 510. For instance, in the illustrated embodiment, programmable device 510 is a one-time programmable device such as content addressable memory (CAM) cells 515. In alternate embodiments, programmable device 510 may be any form of memory device to store input 485, including an array of fuses, and need not be on the same chip as selectable resistor 425. For instance, programmable device 510 can be located virtually anywhere and take virtually any form as long as it provides the appropriate input 485 for the selectable resistor.

Even if the voltage differential at nodes 435 and 445 is reduced by selecting a resistor value, the current differential through transistors 430 and 440 can still change with respect to temperature, process, and source voltage depending on the temperature coefficient, α, of the resistor. In which case, in addition to selecting a resistor value, selectable resistor 425 can also be used to select an appropriate temperature coefficient.

Expressing the equation for selectable resistor 425 in terms of current:

$$V_{R425} = I_{455}R_{425} = \frac{kT}{q}\text{Ln}\left(\frac{A_{D450}}{A_{D460}}\right),$$

$$I_{455} = \frac{kT}{R_{425}q}\text{Ln}\left(\frac{A_{D450}}{A_{D460}}\right).$$

Substituting $R_{425}$ for the equation for resistivity as a function of temperature:

$$I_{455} = \frac{kT}{qR_{425O}(1+\alpha(T-T_O))}\text{Ln}\left(\frac{A_{D450}}{A_{D460}}\right).$$

Taking the partial derivative of current with respect to temperature, and setting equal to zero:

$$0 = \frac{\partial I_{455}}{\partial T} = \frac{k}{qR_{425O}}\text{Ln}\left(\frac{A_{D450}}{A_{D460}}\right)\left(\frac{1}{(1+\alpha(T-T_O))} - \frac{T\alpha}{((1+\alpha(T-T_O))^2}\right).$$

Collecting like terms and rearranging with respect to α:

$$\alpha = \frac{1}{T_O} = \frac{1}{300 \text{ Kelvin}} = 3333.33 \text{ ppm.}$$

That is, the temperature coefficient for selectable resistor 425 should be 3333.33 parts per million (ppm) in order to generate a constant current for a temperature range having a reference temperature of 300 Kelvin. The reference temperature, in one embodiment, is a temperature at the middle of an anticipated range of operating temperatures for the temperature measurement circuitry. In general, the temperature coefficient should be the inverse of the reference temperature.

The above solution for the temperature coefficient is referred to as a "first order" solution. It is only reliable up to a certain level of accuracy. Those skilled in the art will recognize that a solution is needed for multiple temperature coefficients for a wider range of temperatures or a higher level of accuracy. A solution can be calculated using a higher order equation for the resistivity of resistor 425. For instance, a more accurate equation for resistivity is:

$$R_T = R_0(1+\alpha T+\beta T^2+\gamma T^3),$$

where β and γ are additional coefficients.

The first order solution (the inverse of the reference temperature) is usually adequate for applications having an accuracy level of about 16 to 20 bits. A higher order solution may be needed for applications having an accuracy in the range 30 or 40 bits.

In most integrated circuit technologies, a resistor with a temperature coefficient of 3333.33 ppm is not readily available. As illustrated in FIG. 5, the selectable resistor 425 includes a parallel array of resistors that combine two resistors in series, an A resistor component and a B resistor component. To achieve the desired temperature coefficient, a resistor component having a temperature coefficient that is higher than the inverse of the reference temperature is combined with a resistor component having a temperature coefficient that is lower than the inverse of the reference temperature. For instance, in one embodiment, an N-well resistor component with a positive temperature coefficient on the order of 5000 ppm is combined with a poly-1 resistor component with a negative temperature coefficient on the order of −2000 ppm. Any number of mathematical techniques can be used to determine appropriate combinations of the two resistor components to achieve the desired temperature coefficient of the inverse of the reference temperature, 3333.33 ppm in the illustrated embodiment.

In one embodiment, all of the parallel resistor combinations in selectable resistor 425 are designed to have the same resistance value and temperature coefficient that mathematically counteracts temperature variation as discussed above. In which case, the only variation from one resistor to another is due to process variation. In alternate embodiments, the parallel resistor combinations are designed to have resistance values and temperature coefficients over a range of values likely to counteract the various elements of signal variation. In either case, selectable resistor 425 is configured to reduce signal variation in reference current 420. If an adequate resistor combination is found, having both the appropriate resistor value and temperature coefficient, the corresponding input 485 can be programmed as discussed above.

Reference current 420 controls transistors 490, 491, and 492 to produce constant currents 431 and 432. The difference in constant currents 431 and 432 is achieved by cascading different numbers of transistors together for each current. In alternate embodiments, larger current differentials can be achieved by increasing the number of transistors used to generate one current over the number of transistors used to generate the other current, or additional constant currents could be generated. Since reference current 420 has reduced susceptibility to signal variation, both constant currents 431 and 432 also have reduced susceptibility to signal variation.

In alternate embodiments, additional elements within the temperature measurement circuitry can include selectable components like selectable resistor 425. In which case, temperature, process, and source voltage variation in the temperature measurement circuitry can similarly be tuned out through any number of calibration techniques without adding external circuitry.

Figure 6:
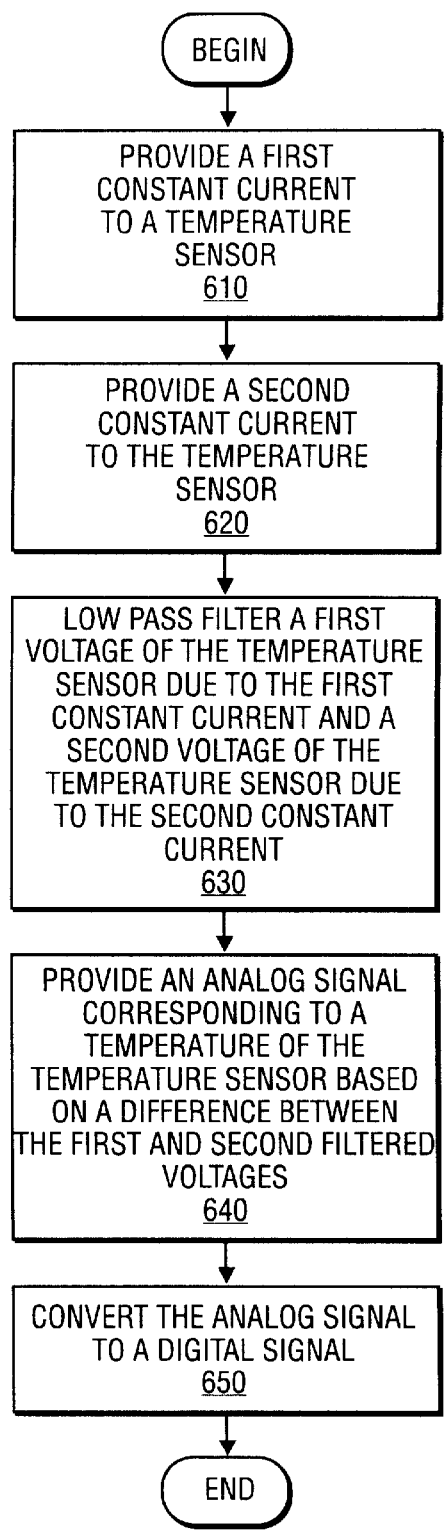
FIG. 6 demonstrates one embodiment of the present invention.

FIG. 6 demonstrates one embodiment of the present invention. In block 610, a first constant current is provided to a temperature sensor. In block 620, a second constant current is provided to a temperature sensor. As discussed above, in various embodiments, the constant currents can be provided sequentially to one diode, or simultaneously to two diodes. In block 630, voltages at the temperature sensor due to the first and second constant currents are filtered. Low pass filters may be used to filter the voltages for high frequency noise introduced by a component associated with the temperature sensor. In alternate embodiments, as discussed above, depending on the nature of the temperature sensor and the component associated with the temperature sensor, if any, filtering may not be necessary. In block 640, based on the difference between the two filtered voltages, an analog signal that corresponds to the temperature at the temperature sensor is provided to an analog to digital converter. In block 650, the analog to digital converter converts the analog signal to a digital signal. In alternate embodiments, as discussed above, depending on the nature of the device to which the temperature measurement is provided, the analog to digital conversion may not be needed.

Figure 7:
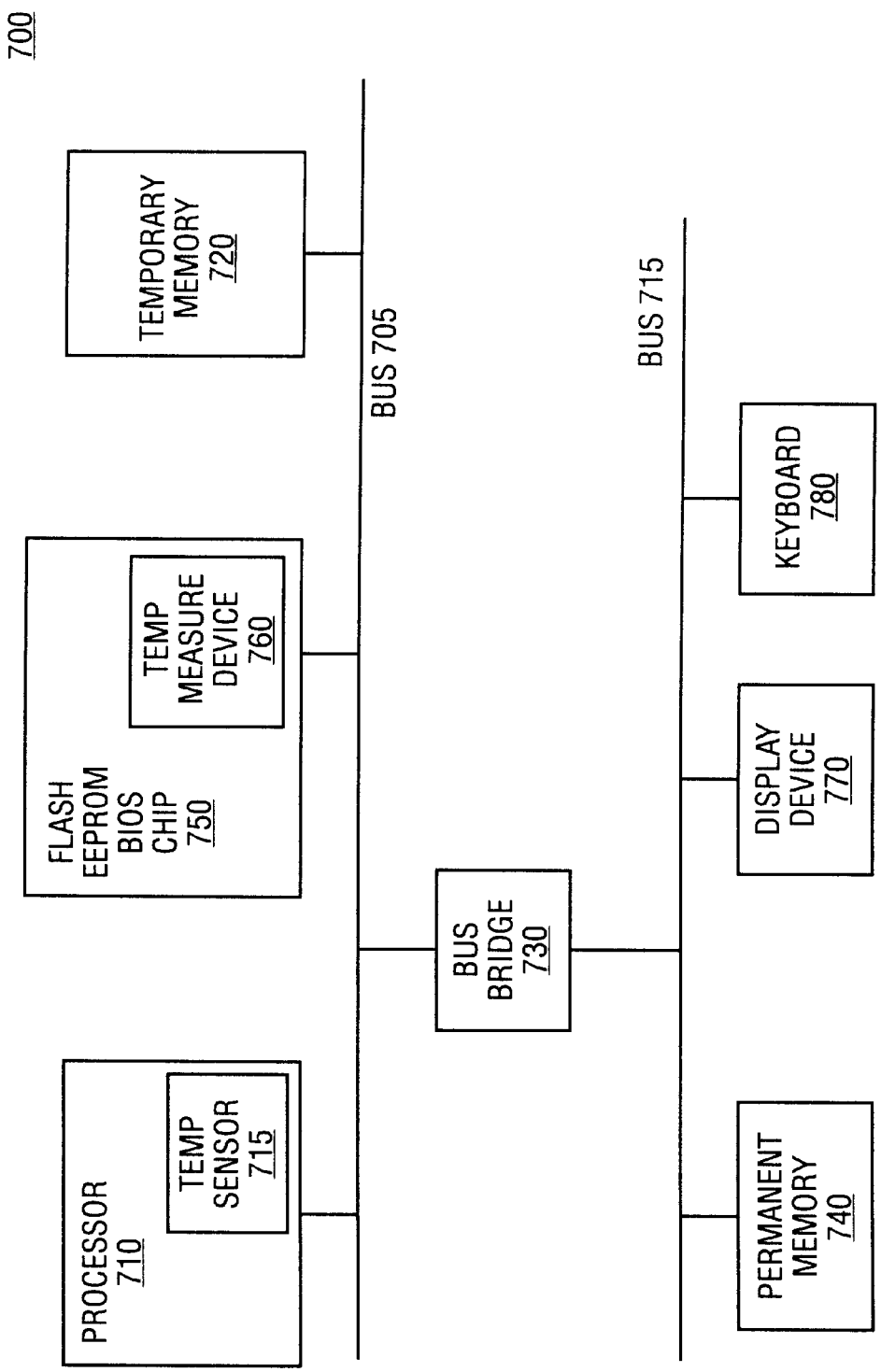
FIG. 7 illustrates one embodiment of a computer system according to the teachings of the present invention.

The present invention can be used in any number of hardware and/or software systems including a broad category of systems known in the art, such as computer systems, set-top boxes, internet appliances, cellular phones, and virtually any other device that uses integrated circuits. FIG. 7 illustrates one embodiment of a suitable hardware system for the present invention. In the illustrated embodiment, the hardware system 700 includes processor 710 coupled to high speed bus 705, which is coupled to input/output (I/O) bus 715 through bus bridge 730. Temporary memory 720 and flash electrically erasable programmable read only memory (EEPROM) basic input/output system (BIOS) chip 750 are coupled to bus 705. Permanent memory 740 is coupled to bus 715. Display device 770 and keyboard 780 are also coupled to bus 715.

Processor 710 includes temperature sensor 715 which is similar to temperature sensor 110 from FIG. 1. Flash chip 750 includes temperature measurement device 760 which is similar to the temperature measurement circuitry from FIG. 1. In the illustrated embodiment, the constant currents, analog voltages, and digital output signal are all transmitted over the high speed bus. In alternate embodiments, one or more of the constant currents, analog voltages, and digital output signal may be transmitted over dedicated signal lines (not shown) between flash chip 750 and processor 710.

Certain embodiments may not require all of the above components, may include additional components, or may combine one or more components. For instance, flash chip 750 may be on-chip with processor 710. Permanent memory 740 may be eliminated and temporary memory 720 may be replaced with flash chip 750, wherein software routines are executed in place from flash chip 750. Some implementations may employ a single bus to which all of the components are coupled. Additional components may include additional processors, storage devices like a CD ROM, memories, and other peripheral components known in the art, and the additional components may be coupled to one or more additional buses through additional bus bridges.

Alternately, the present invention could be implemented in any number of additional hardware machines or components to perform analog temperature measurements. For instance, one or more ASICs (application specific integrated circuits) or PGAs (programmable gate arrays) could be endowed with some or all of the functionality of the present invention, and inserted into system 700 of FIG. 7 as additional components not shown, or combined with one or more other components.

Thus, an analog temperature measurement apparatus is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A temperature measurement device comprising:
at least one constant current generator to provide a first current and a second current to a temperature sensor; and
a signal processing element to provide an analog output signal corresponding to a temperature of the temperature sensor based on a difference between a first voltage of the temperature sensor at the first current and a second voltage of the temperature sensor at the second current.

2. The temperature measurement device of claim 1 further comprising:
an analog-to-digital converter to convert the analog output signal to a digital output signal corresponding to the temperature of the temperature sensor.

3. The temperature measurement device of claim 2 wherein the analog-to-digital converter is to provide the digital output signal to a control device, said control device to control operation of a component associated with the temperature sensor based on the digital output signal.

4. The temperature measurement device of claim 1 wherein the temperature sensor is one of an internal temperature sensor and an external temperature sensor.

5. The temperature measurement device of claim 1 further comprising:
a low pass filter to filter noise caused by a component associated with the temperature sensor from the first voltage and the second voltage.

6. The temperature measurement device of claim 1 wherein the at least one constant current generator comprises:
circuitry to generate a driver current based on a supply signal and a difference between a first reference value and a second reference value, said driver current having a first current variation due to at least one of a process variation, a temperature variation, and a variation in the supply signal;
a first reference device to provide the first reference value based on an input signal; and
a second reference device to provide the second reference value based on the input signal, said second reference value to be any one of a first plurality of selectable reference values, at least one of said first plurality of selectable reference values to reduce the first current variation.

7. The temperature measurement device of claim 6 wherein the at least one constant current generator further comprises:
a first set of at least one transistor to provide the first current based on the driver current; and
a second set of at least one transistor to provide the second current based on the driver current, said first and second sets of transistors having a different number of transistors.

8. The temperature measurement device of claim 6 wherein the first reference device comprises a diode, and wherein the temperature variation comprises a voltage decrease across the diode as temperature increases.

9. The temperature measurement device of claim 6 wherein the second reference device comprises:
a diode, wherein the temperature variation comprises a voltage decrease across the diode as temperature increases;
a plurality of resistors coupled in parallel, wherein the first plurality of selectable reference values comprise a different voltage increase across each of the plurality of resistors as temperature increases; and
logic to select one of the plurality of resistors coupled in parallel to be active in the second reference device based on an input value.

10. The temperature measurement device of claim 9 wherein the logic to select one of the plurality of resistors comprises a memory device to store the input value.

11. The temperature measurement device of claim 9 wherein each of the plurality of resistors coupled in parallel comprises a different temperature coefficient.

12. The temperature measurement device of claim 9 wherein at least one of the plurality of resistors coupled in parallel comprises a temperature coefficient substantially equal to an inverse of a reference temperature.

13. The temperature measurement device of claim 9 wherein each of the plurality of resistors coupled in parallel comprises a first resistor component having a temperature coefficient higher than an inverse of a reference temperature and a second resistor component having a temperature coefficient lower than the inverse of the reference temperature.

14. The temperature measurement device of claim 13 wherein the first resistor component comprises an N-well resistor and the second resistor component comprises a poly-1 resistor.

15. The temperature measurement device of claim 1 wherein the signal processing element comprises a differential switch capacitor operational amplifier.

16. The temperature measurement device of claim 1 wherein the signal processing element comprises:
first circuitry to store the first voltage; and
second circuitry to receive the second voltage and the stored first voltage.

17. The temperature measurement device of claim 1 wherein the signal processing element comprises:
circuitry to receive the first and second voltages simultaneously.

18. A system comprising:
a processor;
a temperature sensor associated with the processor;
a bus; and
a flash electrically erasable programmable read only memory (EEPROM) coupled to the processor via the bus to store a basic input/output system (BIOS) for the processor, said flash EEPROM including a temperature measurement device comprising
at least one constant current generator to provide a first current and a second current to a temperature sensor; and
a signal processing element to provide an analog output signal corresponding to a temperature of the temperature sensor based on a difference between a first voltage of the temperature sensor at the first current and a second voltage of the temperature sensor at the second current.

19. The system of claim 18 wherein the temperature sensor comprises one of:
a single diode to separately receive the first current and the second current; and
a first diode to receive the first current and a second diode to receive the second current simultaneously.

20. The system of claim 18 wherein the temperature measurement device further comprises:
an analog-to-digital converter to convert the analog output signal to a digital output signal corresponding to the temperature of the temperature sensor.

21. The system of claim 20 wherein the temperature measurement device is to further provide the digital output signal over the bus to the processor, said processor to operate based on the output signal.

22. The system of claim 18 wherein the temperature measurement device further comprises:
a low pass filter to filter noise in the first voltage and the second voltage due to the processor.

23. A method comprising:
providing a first constant current to a temperature sensor;
providing a second constant current to the temperature sensor; and
providing an analog output signal corresponding to a temperature of the temperature sensor based on a difference between a first voltage of the temperature sensor at the first constant current and a second voltage of the temperature sensor at the second constant current.

* * * * *